Aug. 10, 1943. W. J. CLEMENTS 2,326,439
HOSE CONNECTION FOR VACUUM CLEANERS AND THE LIKE
Original Filed July 1, 1939    2 Sheets-Sheet 1
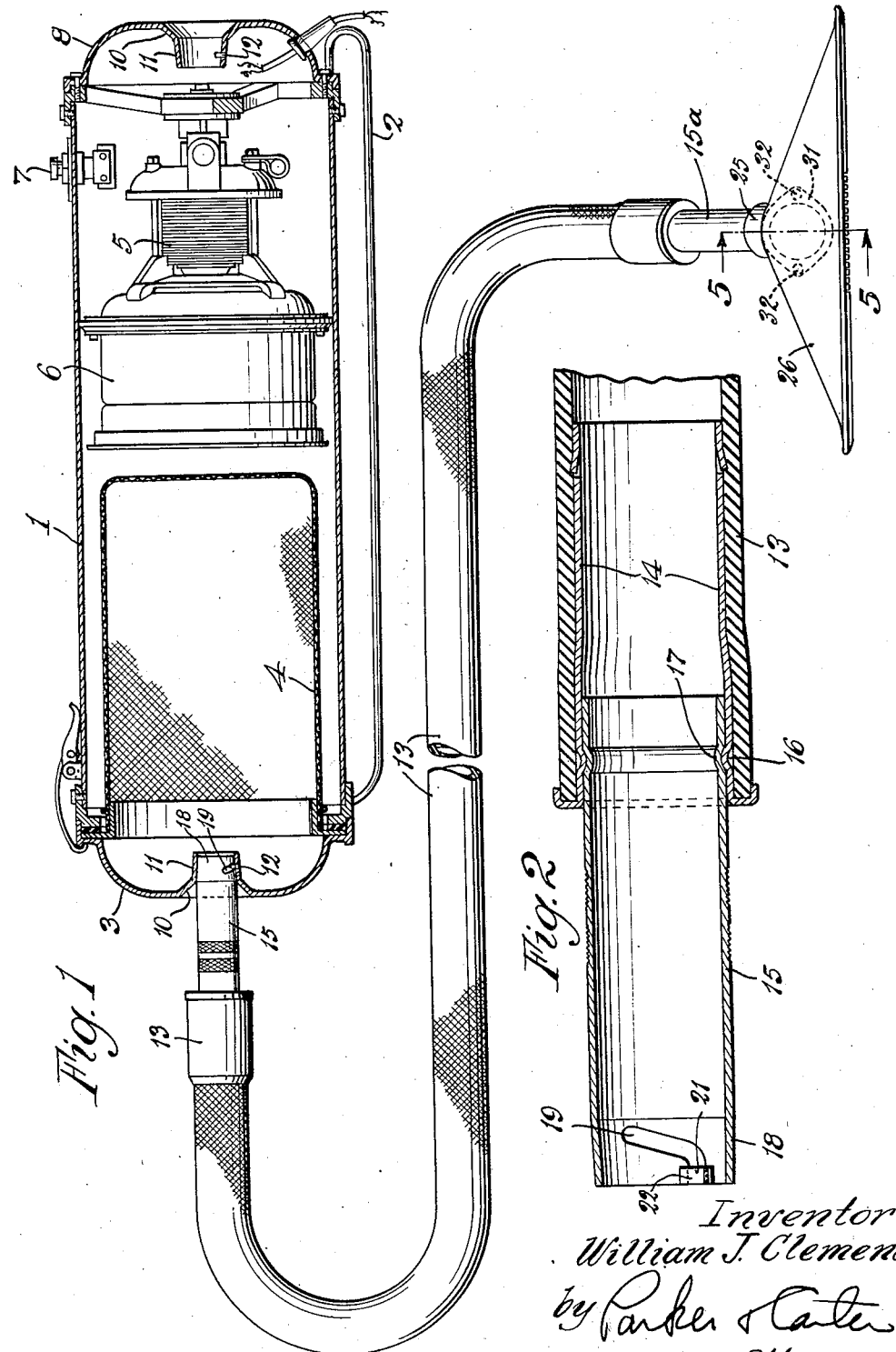
Inventor
William J. Clements
by Parker & Carter
Attorneys.

Aug. 10, 1943. W. J. CLEMENTS 2,326,439
HOSE CONNECTION FOR VACUUM CLEANERS AND THE LIKE
Original Filed July 1, 1939  2 Sheets-Sheet 2
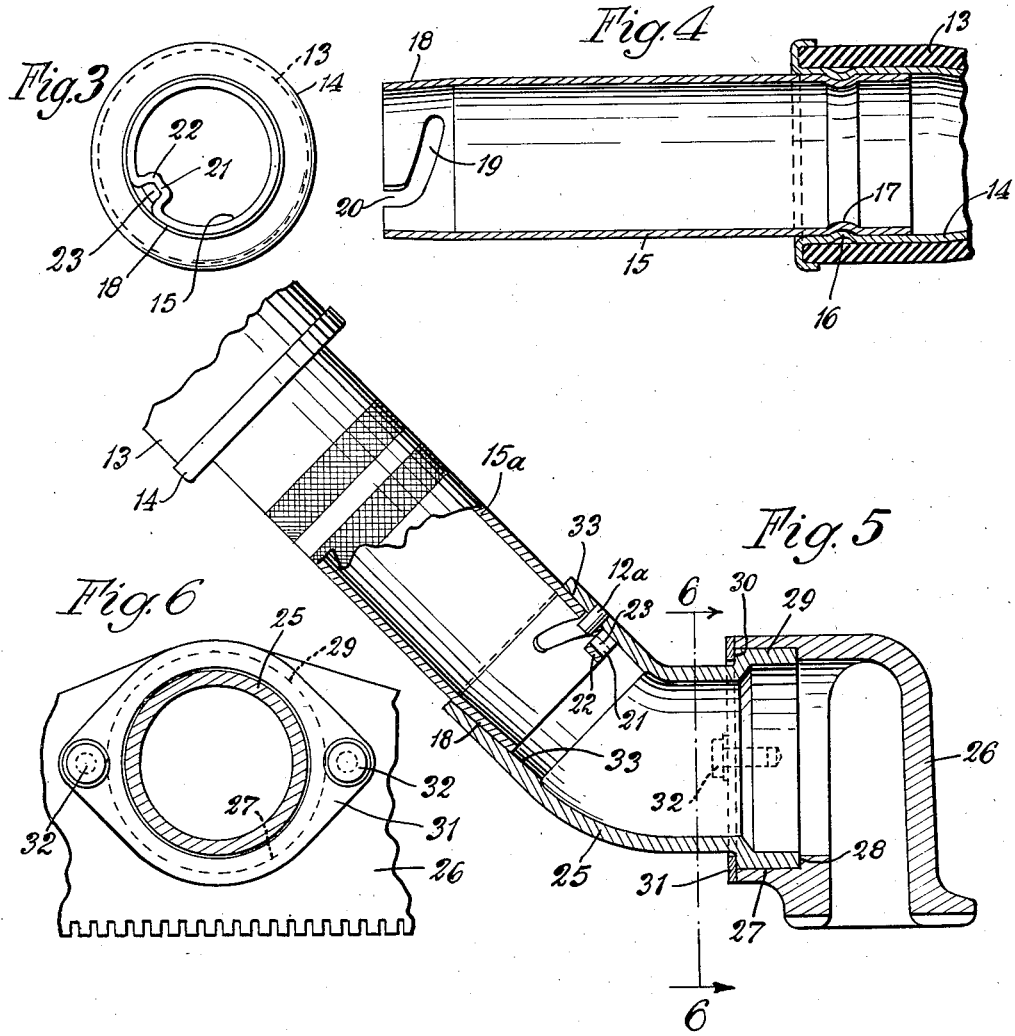
Inventor
William J. Clements
by Parker & Carter
Attorneys.

Patented Aug. 10, 1943

2,326,439

UNITED STATES PATENT OFFICE 2,326,439

HOSE CONNECTION FOR VACUUM CLEANERS AND THE LIKE

William J. Clements, Chicago, Ill., assignor to Clements Mfg. Co., Chicago, Ill., a corporation of Illinois Original application July 1, 1939, Serial No. 282,372. Divided and this application April 11, 1941, Serial No. 388,050

4 Claims. (Cl. 285—175)

My invention relates to an improvement in hose connections for vacuum cleaners and tools therefor.

One purpose is the provision of an improved hose connection which can be quickly and tightly applied to a vacuum cleaner or to a tool.

Another purpose is the provision of a connecting hose provided with uniform securing means at each end, whereby either end may be selectively secured either to a vacuum cleaner or to a tool for use therewith.

Another purpose is the provision of an improved bearing connection for use with vacuum cleaner tools.

Other purposes will appear from time to time in the course of the specification and claims.

The present application is a division of my co-pending application for Letters Patent Serial No. 282,372, filed in the United States Patent Office on July 1, 1939, which matured into Patent 2,245,760.

I illustrate my invention more or less diagrammatically in the accompanying drawings wherein:

Fig. 1 is a general illustration, partly in elevation and partly in section, of a vacuum cleaner and tool therefor, and a hose connection therebetween;

Fig. 2 is an axial section of a hose connection part on an enlarged scale;

Fig. 3 is an end view of the structure shown in Fig. 2;

Fig. 4 is a similar section to Fig. 2, illustrating a variation;

Fig. 5 is a section on an enlarged scale taken on the line 5—5 of Fig. 1; and

Fig. 6 is a section on the line 6—6 of Fig. 5.

Like parts are indicated by like symbols throughout the specification and drawings.

Referring to the drawings, 1 generally indicates a tubular cleaner housing of the tank type, which may for example be supported on tracks 2, or any other suitable supporting means whereby the tank is slidably supported on the floor. 3 is a removable closure cap at the suction or inlet end of the tank. 4 is a dirt bag. 5 is any suitable motor, and 6 any suitable fan structure, controlled for example by any suitable switch mechanism 7. 8 is a removable end closure for the blowing or discharge end of the vacuum cleaner. The closures 3 and 8 may be made identical or substantially identical, and they are at least alike in that each is provided with an aperture, preferably coaxial, which is defined by an outer conic portion 10 and an inner slightly conic portion 11, having inwardly projecting from the side thereof any suitable pin or locking element 12.

13 generally indicates any suitable flexible tube or hose. At each end of the hose is positioned a fixed tubular portion 14, in which is rotatable a locking and connecting tube 15. The two tubes may be secured together, for example by interpenetrating inward offsets 16 and 17, whereby their relative rotation is permitted, but they are held against relative endwise movement, and their fit is sufficiently snug as to prevent any perceptible pressure loss or air leakage. The outer end of each tube 15 has a slightly conic portion 18, in which conic portion is formed an inclined bayonet slot 19. In the form of Fig. 4 this bayonet slot may include an end portion 20, extending generally along the axis of the tube, but in the form of Figs. 2 and 3 I illustrate merely a notch or offset 21 formed in a bridge 22, which prevents the necessity of cutting through the lip or reduced end of the portion 18. The notch thus formed, as at 23, is of greater depth than the length of the interpenetrating pin 12. In securing the hose 13 to the housing 1, all that is necessary is to insert the tube 15 in such fashion that the pin 12 penetrates the slot 19. A slight rotation of the tube 15 will then, by camming action, draw the tube 15 inwardly and firmly lock its slightly conic portion 18 against the opposed and generally conforming surface of the conic portion 11 of the closure 3 or 8, as the case may be.

The flexible tube 13 may serve as a means for conveying the housing 1 along the floor. At the outer end of the hose 13 is a second tubular connector 15a, which may be identical with the above described connector tube 15. As shown in Fig. 5, it may be inserted into an elbow or swivel connection 25 of any suitable floor engaging tool 26. The details of the tool do not of themselves form part of the present invention. It may be provided with a cylindrical socket 27, having a ledge 28 at the inner end thereof. Into the socket so formed may penetrate the cylindrical bearing member 29 of the elbow 25. It is provided with a ledge 30, against which may abut a locking ring 31, which may be screwed or otherwise secured to the tool, as for example by screws 32. This provides a simple swivel connection whereby the member 25 may rotate in relation to the tool. At the outer end of the member 25 is a portion having an inner conic surface 33 and an inwardly extending pin 12a. The surface 33 is preferably substantially the same in angle and diameter as the corresponding surface of the member 11 of the closures 3 and 8. Thus, either end of the flexible hose 13 may, with equal ease, be secured to either end of the housing 1, or to any tool with which the operator wishes to work.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

I claim:

1. In combination, in a hose connection, a generally cylindrical thin metal tube having an inwardly tapered generally conic end portion, the tube wall being penetrated by a bayonet slot extending inwardly generally longitudinally from the reduced end edge of said tapered portion and having an inclined inner portion, a second tube having a conic portion adapted to mate with and conform to the exterior of the conic portion of the first tube, and an inwardly projecting locking element, adapted to extend into said slot, the inclined inner end portion of the slot in the first tube being adapted, in response to relative rotation of the tubes, and its engagement with said locking element, to draw said tubes together and to lock their tapered surfaces against each other, the inner edge of the inner tube being free when the tubes are locked.

2. In combination, in a hose connection, a generally cylindrical thin metal tube having an inwardly tapered generally conic end portion, the tube wall being penetrated by a bayonet slot extending inwardly generally longitudinally from the reduced end edge of said tapered portion and having an inclined inner portion, a second tube having a conic portion adapted to mate with and conform to the exterior of the conic portion of the first tube, and an inwardly projecting locking element, adapted to extend into said slot, the inclined inner end portion of the slot in the first tube being adapted, in response to relative rotation of the tubes, and its engagement with said locking element, to draw said tubes together and to lock their tapered surfaces against each other, the inner edge of the inner tube being free when the tubes are locked, the end of said slot adjacent the edge of the tube being bridged by an inwardly crimped portion of the edge of the conic portion of the tube, said inward crimping being of sufficient radial depth to clear the inwardly projecting locking element of the second tube.

3. In combination, in a hose connection, a generally cylindrical thin metal tube having an inwardly tapered generally conic end portion, the tube wall being penetrated by a bayonet slot extending inwardly generally longitudinally from the reduced end edge of said tapered portion and having an inclined inner portion located within and terminating within the conic portion of the tube, a second tube having a conic portion adapted to mate with and conform to the exterior of the conic portion of the first tube, and an inwardly projecting locking element, adapted to extend into said slot, the inclined inner end portion of the slot in the first tube being adapted, in response to relative rotation of the tubes, and its engagement with said locking element, to draw said tubes together and to lock their tapered surfaces against each other, the inner edge of the inner tube being free when the tubes are locked.

4. In combination, in a hose connection, a generally cylindrical thin metal tube having an inwardly tapered generally conic end portion, the tube wall being penetrated by a bayonet slot extending inwardly generally longitudinally from the reduced end edge of said tapered portion and having an inclined inner portion, a second tube having a conic portion adapted to mate with and conform to the exterior of the conic portion of the first tube, and an inwardly projecting locking element, adapted to extend into said slot, the inclined inner end portion of the slot in the first tube being adapted, in response to relative rotation of the tubes, and its engagement with said locking element, to draw said tubes together and to lock their tapered surfaces against each other, the inner edge of the inner tube being free when the tubes are locked, said locking element projecting inwardly from, and being located intermediate the ends of, the conic portion of said second tube.

WILLIAM J. CLEMENTS.